(12) United States Patent
Luo et al.

(10) Patent No.: US 8,495,165 B2
(45) Date of Patent: Jul. 23, 2013

(54) SERVER AND METHOD FOR THE SERVER TO ACCESS A VOLUME

(75) Inventors: Jiaolin Luo, Beijing (CN); Guobin Zhang, Chengdu (CN); Maoyin Liu, Chengdu (CN)

(73) Assignee: Chengdu Huawei Symantec Technologies Co., Ltd., Chengdu (CN)

(*) Notice: Subject to any disclaimer, the term of this patent is extended or adjusted under 35 U.S.C. 154(b) by 0 days.

(21) Appl. No.: 13/525,626

(22) Filed: Jun. 18, 2012

(65) Prior Publication Data

US 2012/0259941 A1  Oct. 11, 2012

Related U.S. Application Data

(63) Continuation of application No. PCT/CN2010/079866, filed on Dec. 16, 2010.

(30) Foreign Application Priority Data

Dec. 17, 2009 (CN) .......................... 2009 1 0252493

(51) Int. Cl.
*G06F 15/167* (2006.01)
(52) U.S. Cl.
USPC ................ 709/212; 711/2; 711/114; 711/202
(58) Field of Classification Search
USPC .......................................... 709/212
See application file for complete search history.

(56) References Cited

U.S. PATENT DOCUMENTS

| 5,426,751 | A | 6/1995 | Sawamoto |
| 2005/0102484 | A1 | 5/2005 | Liu et al. |
| 2006/0184731 | A1* | 8/2006 | Corbett et al. ................ 711/114 |
| 2008/0301333 | A1 | 12/2008 | Butler et al. |

FOREIGN PATENT DOCUMENTS

| CN | 101763313 A | 6/2010 |
| EP | 1868075 | * 12/2007 |
| EP | 1868075 A2 | 12/2007 |

OTHER PUBLICATIONS

Written Opinion of the International Searching Authority in corresponding International Patent Application No. PCT/CN2010/079866 (Mar. 17, 2011).
International Search Report in corresponding International Patent Application No. PCT/CN2010/079866 (Mar. 17, 2011).
Extended European Search Report in corresponding European Patent Application No. 10837048.7 (Dec. 19, 2012).

* cited by examiner

*Primary Examiner* — Hua Fan
(74) *Attorney, Agent, or Firm* — Leydig, Voit & Mayer, Ltd.

(57) ABSTRACT

Embodiments of the present technical solution relate to the technique field of storage, and disclose a server and a method for the server to access a volume. The method comprises: determining, from a first list, a block that needs to be accessed according to an access offset of a volume that needs to be accessed; determining, from a second list, a storage controller corresponding to the block that needs to be accessed according to the determined block; and sending a data reading request or a data writing request to the storage controller corresponding to the block that needs to be accessed to process. Embodiments of the present invention can reduce time delay when the data reading request or the data writing request of the server reaches the block that needs to be accessed.

8 Claims, 4 Drawing Sheets

SERVER AND METHOD FOR THE SERVER TO ACCESS A VOLUME

CROSS-REFERENCE TO RELATED APPLICATIONS

This application is a continuation of International Application PCT/CN2010/079866, filed on Dec. 16, 2010, which claims priority to Chinese Patent Application No. 200910252493.7, filed on Dec. 17, 2009, both of which are hereby incorporated by reference in their entireties.

FIELD OF THE INVENTION

The present invention relates to the technique field of storage, and in particular, to a server and a method for the server to access a volume.

BACKGROUND OF THE INVENTION

In the storage architecture of the multiple storage controllers multiple storage controllers, volume is a kind of logical medium for storing data. Each volume is labeled with a unique identity (ID) for differentiation. Each volume can be divided into a plurality of blocks with the same size. Block is the smallest storage unit for storing data. The blocks into which one volume is divided can be distributed to a plurality of storage controllers in the storage architecture, so that one block corresponds to one storage controller. Each storage controller can be connected to a server through a switch. When the server needs to write data into a volume, each of the storage controllers can simultaneously write data on the server to the blocks into which that volume is divided; when the server needs to read data from a volume, each of the storage controllers can simultaneously read data from the blocks into which that volume is divided and return data to the server. The simultaneous processing of a plurality of storage controllers helps to achieve better performance.

The server can sometimes read data from or write data into one block of a volume. For example, when the server receives an external input command or runs a certain program, it can send a data reading request or a data writing request carrying an access offset of the volume to the storage controller that maps the volume ID of the volume (each storage controller maps one or more volume IDs on the server); the storage controller determines which block the server needs to access according to the access offset and therefore finds the storage controller corresponding to the block which the server needs to access. If the found storage controller is another storage controller, the data reading request or the data writing request will be forwarded, through the high-speed link wire between storage controllers, to a corresponding storage controller to process. The corresponding storage controller can write the data on the server into the block which the server needs to access according to the writing request of the server, or, read the data from the block which the server needs to access according to the reading request of the server and return the data to the server, thereby achieving the objective that the server accesses a volume.

As such, when the storage controller corresponding to a block which the server needs to access is another storage controller but not the storage controller that conducts the query, the data reading request or the data writing request of the server needs to be forwarded to the corresponding storage controller, enlarging the time delay when the data reading request or the data writing request reaches the block that needs to be accessed. In addition, the storage controller needs to temporarily store the data reading request or the data writing request and then implement forward the request, occupying the memory resources of the server.

SUMMARY OF THE INVENTION

Embodiments of the present invention provide a server and a method for the server to access a volume to enable the server to access a volume.

To solve the preceding technical problem, embodiments of the present invention provide the following technical solution:

A method for accessing the storage architecture of the multiple storage controllers multiple storage controllers is provided in embodiments of the present invention. The method includes: determining, from a first list, a block that needs to be accessed according to an access offset of a volume that needs to be accessed, wherein the first list is configured to store information of at least two blocks into which the volume is divided;

determining, from a second list, a storage controller corresponding to the block that needs to be accessed according to the determined block, wherein the second list is configured to store information of a storage controller corresponding to each of the blocks into which the volume is divided; and sending a data reading request or a data writing request to the storage controller corresponding to the block that needs to be accessed to process.

A server is provided in embodiments of the present invention. The server includes:

a first determining module, configured to determine, from a first list, a block that needs to be accessed according to an access offset of a volume that needs to be accessed, wherein the first list is configured to store information of at least two blocks into which the volume is divided;

a second determining module, configured to determine, from a second list, a storage controller corresponding to the block that needs to be accessed according to the block that needs to be accessed, wherein the second list is configured to store information of a storage controller corresponding to each of the blocks into which the volume is divided; and a sending module, configured to send a data reading request or a data writing request to the storage controller corresponding to the block determined by the second determining module to process.

By comparison with the prior art, according to embodiments of the present invention, a volume is divided into at least two blocks with the same size and the information of each storage controller corresponding to each of the blocks is stored on the server, allowing the server to access a block according to the access offset of the volume that needs to be accessed and then determine the storage controller corresponding to the block. The server can directly send a data reading request or a data writing request to the determined storage controller to process. In this way, the following case may be prevented: The data reading request or the data writing request of the server needs to be forwarded to a corresponding storage controller when the found storage controller corresponding to the block which the server needs to access is another storage controller but not the one that conducts the query. Therefore, the time delay when the data reading request or the data writing request of the server reaches the block that needs to be accessed is shortened and the memory resources of the storage controller occupied by the data reading request or the data writing request of the server are decreased.

BRIEF DESCRIPTION OF THE DRAWINGS

To describe the technical solution in embodiments of the present invention clearly, the following describes the accompanying drawings for describing the embodiments. Apparently, the accompanying drawings are only some embodiments of the present invention and those skilled in the art my also derive other drawings from these accompanying drawings without any creative effort.

DETAILED DESCRIPTION OF THE EMBODIMENTS

The technical solution in embodiments of the present invention is clearly and fully described in the following with reference to the accompanying drawings in embodiments of the present invention. It is evident that the embodiments are only some exemplary embodiments of the present invention, and the present invention is not limited to such embodiments. All other embodiments that those skilled in the art obtain based on embodiments of the present invention also shall fall within the protection scope of the present invention.

Embodiment 1

Figure 1:
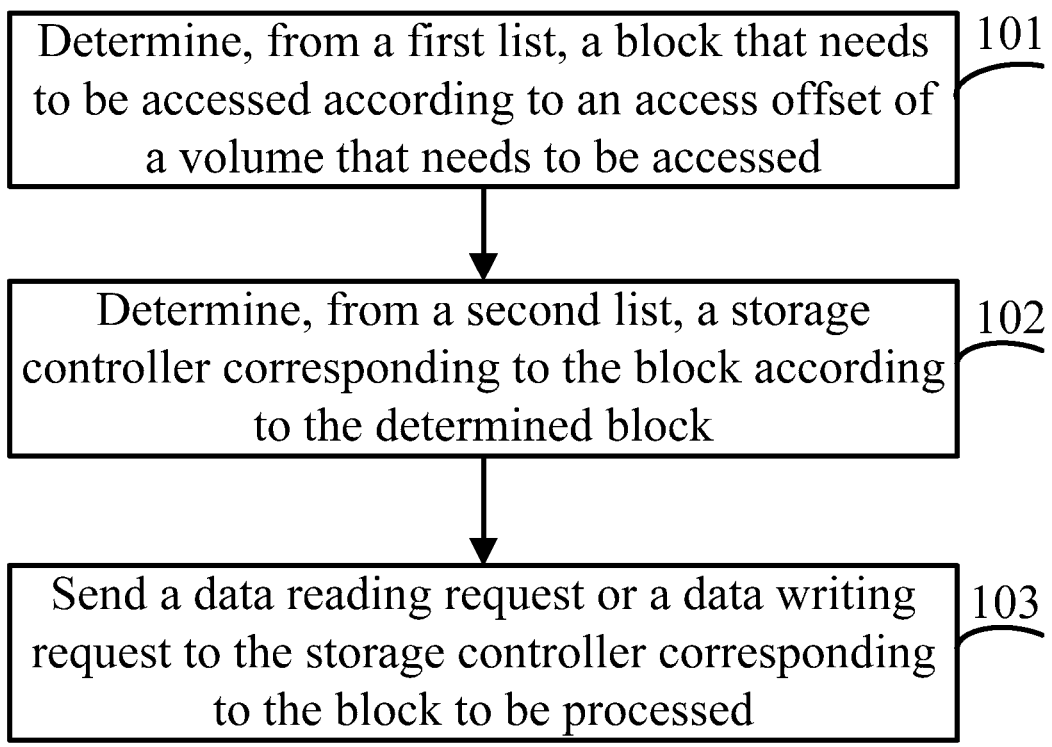
FIG. 1 is a flowchart of a method for a server to access a volume according to an embodiment of the present invention.

FIG. 1 is a flowchart of a method for a server to access a volume provided in this embodiment of the present invention. As shown in FIG. 1, the method includes the following steps:

101: Determine, from a first list, a block that needs to be accessed according to an access offset of a volume that needs to be accessed.

For example, the server needs to access a volume when receiving an external input command or running a certain program. In this embodiment and the following embodiments, that server accesses a volume may include the following: the server reads data from a volume, or, the server writes data into a volume to store the data.

The preceding first list can store the information of at least two blocks with the same size into which a volume is divided. In this embodiment of the present invention, the information of the blocks may be the sequence numbers or the identities of the blocks. The format of the first list may be similar to that of Table 1 in the following. Table 1 stores sequence numbers of N (N is a natural number) blocks and these N blocks are obtained by dividing the volume corresponding to a volume ID and these N blocks have the same size.

TABLE 1

| Volume ID | Block 1 | Block 2 | Block 3 | ... | Block N |
| --- | --- | --- | --- | --- | --- |

Furthermore, a plurality of rows can be set in the first list of the preceding Table 1 for storing the information of blocks with the same size into which each of a plurality of volumes is divided. Volume IDs of a plurality of volumes are different and are not limited in this embodiment of the present invention.

102: Determine a storage controller corresponding to the block from a second list according to the determined block.

The preceding second list stores information of each of the blocks into which a volume is divided and its corresponding storage controller. In this embodiment of the present invention, the information of each of the blocks and its corresponding storage controller may be the sequence numbers or identities of storage controllers corresponding to each of the blocks. The format of the second list may be similar to that of Table 2 in the following. Table 2 stores the sequence numbers of N (N is a natural number) storage controllers, and each of the blocks corresponds to one storage controller.

TABLE 2

| Volume ID | Storage controller |
| --- | --- |
| Block 1 | Storage controller 1 |
| Block 2 | Storage controller 2 |
| Block 3 | Storage controller 3 |
| ... | ... |
| Block N | Storage controller N |

Furthermore, a plurality of columns may be set in the second list as shown in the preceding Table 2 for storing blocks with the same size into which each of a plurality of volumes is divided. For the blocks with the same size into which the same volume is divided, each of the blocks corresponds to a different storage controller, or, a plurality of blocks correspond to the same storage controller, which is not limited in this embodiment of the present invention.

103: Send a data reading request or a data writing request to the storage controller corresponding to the block to process.

Because each storage controller can be connected to the server through a switch, and after the preceding 102 determines the block which the server needs to access, a data reading request or a data writing request may be sent to the switch and then forwarded by the switch to the corresponding storage controller to process.

The storage controller corresponding to the block can write data on the server into the block which the server needs to access according to the writing request of the server, or, read data from the block which the server needs to access according to the reading request of the server and return data to the server, thereby achieving the objective that the server accesses a volume.

Furthermore, the method provided in this embodiment of the present invention may include the following:

obtaining, from a meta data server (Meta Data Server, MDS), the information of at least two blocks with the same size into which the volume is divided and the information of each of the blocks into which the volume is divided and its corresponding storage controller, and writing the information of at least two blocks into which the volume is divided into the preceding first list and the information of each of the blocks into which the volume is divided and its corresponding storage controller into the preceding second list.

For example, obtaining from the MDS, by the server, the information of at least two blocks with the same size into which a volume is divided and the information of each of the blocks and its corresponding storage controller in detail can be as follows: The server receives, from the MDS, the information of at least two blocks with the same size into which a volume is divided and the information of each of the blocks and its corresponding storage controller.

For example, obtaining from the MDS, by the server, the information of at least two blocks with the same size into which a volume is divided and the information of each of the blocks and its corresponding storage controller in detail may also be as follows:

The server is loaded with multi-path software, the multi-path software can obtain, from the MDS, the information of at least two blocks with the same size into which a volume is divided and the information of each of the blocks and its corresponding storage controller when the multi-path software is initializing.

The MDS can be an independent server or one storage controller of a plurality of storage controllers. The MDS is used for recording the information of blocks with the same size into which each volume is divided and the information of each of the blocks and its corresponding storage controller, which is the common knowledge for those skilled in the art and is not introduced in this embodiment of the present invention.

By using the method provided in this embodiment of the present invention, the following case may be prevented: A data reading request or a data writing request of the server to a corresponding storage controller is forwarded when the storage controller that corresponds to the block to which the server request access and found by a storage controller is another storage controller. Therefore, the time delay when the data reading request or the data writing request of the server reaches the block that needs to be accessed is shortened and the memory resources of the storage controller occupied the data reading request or the data writing request of the server are decreased. For example, the 101 that the server determines a block that needs to be accessed from a first list according to an access offset of a volume may be implemented in the following way but not limited to such way:

A: Divide the access offset of the volume by the size of the blocks into which the volume is divided, wherein the size is stored in the first list to obtain a quotient; and B: Add 1 to the integral part of the quotient to obtain the block that needs to be accessed.

It is assumed that, in the first list shown in the preceding Table 1, the size of the volume corresponding to a volume ID is 320 MB and the volume ID is divided into 10 blocks (N is 10) with the same size, that is, the size of block 1 is 32 MB, the size of block 2 is 32 MB . . . and the size of block 10 is 32 MB. If the access offset of the volume ID that needs to be accessed is 40 MB, 40/32=1.25; it is determined that the block which the server needs to access is block 2 by adding 1 to the integral part of 1.25. Specifically, the server may start to access block 2 from the 8 MB (40 MB−32 MB=8 MB) address of block 2.

Embodiment 2

Figure 2:
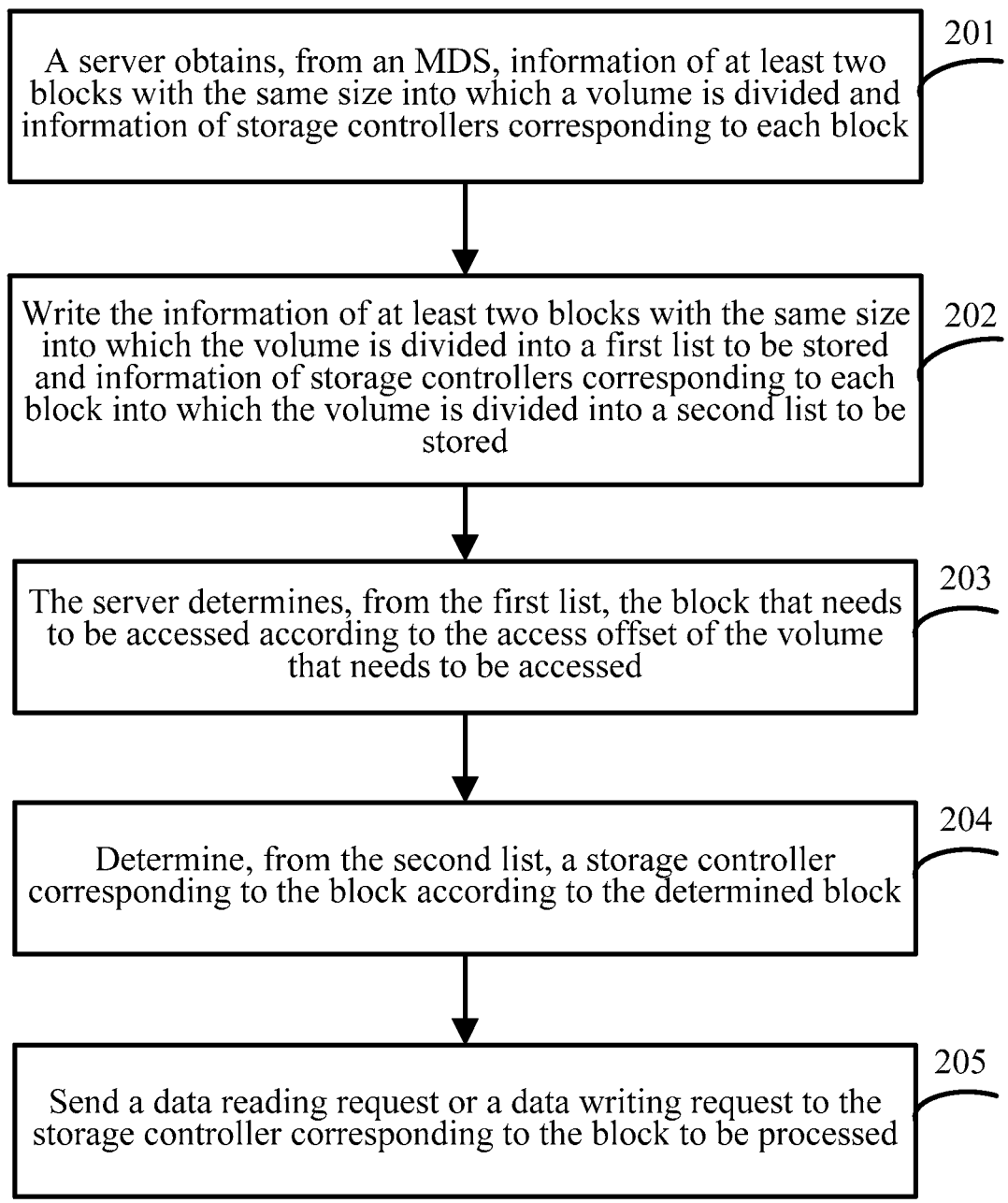
FIG. 2 is a flowchart of another method for a server to access a volume according to an embodiment of the present invention.

FIG. 2 is a flowchart of another method for a server to access a volume provided in this embodiment of the present invention. As shown in FIG. 2, the method may include the following steps:

201: A server obtains, from an MDS, the information of at least two blocks with the same size into which a volume is divided and the information of each of the blocks and its corresponding storage controller.

For example, obtaining from the MDS, by the server, the information of at least two blocks with the same size into which a volume is divided and the information of each of the blocks and its corresponding storage controller in detail may be as follows:

The server receives, from the MDS, the information of at least two blocks with the same size into which a volume is divided and the information of each of the blocks and its corresponding storage controller.

For example, obtaining from the MDS, by the server, the information of at least two blocks with the same size into which a volume is divided and the information of each of the blocks and its corresponding storage controller in detail may also be as follows:

The server is loaded with multi-path software, the multi-path software can obtain, from the MDS, the information of at least two blocks with the same size into which a volume is divided and the information of each of the blocks and its corresponding storage controller when the multi-path software is initializing.

The MDS can be an independent server or one storage controller of a plurality of storage controllers. The MDS is used for recording the information of blocks with the same size into which each volume is divided and the information of each of the blocks and its corresponding storage controller, which is the common knowledge for those skilled in the art and is not introduced in this embodiment of the present invention.

202: Write the information of at least two blocks with the same size into which the volume is divided into a first list for storage and the information of each of the blocks into which the volume is divided and its corresponding storage controller into a second list for storage.

The format of the first list may be similar to that shown in the preceding Table 1, and the format of the second list may be similar to that shown in the preceding Table 2 and here are not described in this embodiment of the present invention.

203: The server determines, from the first list, the block that needs to be accessed according to an access offset of the volume that needs to be accessed.

For example, the server needs to access a volume when receiving an external input command or running a certain program.

For example, the server may obtain a quotient by dividing the access offset of the volume by the size of the blocks into which the volume is divided, wherein the size is stored in the first list and determine the block that needs to be accessed by adding 1 to the integral part of the obtained quotient.

It is assumed that, in the first list shown in the preceding Table 1, the size of the volume corresponding to a volume ID is 320 MB and the volume is divided into 10 blocks (N is 10) with the same size, that is, the size of block 1 is 32 MB, the size of block 2 is 32 MB . . . and the size of block 10 is 32 MB. If the access offset of the volume ID that needs to be accessed is 20 MB, 20/32=0.625; it is determined that the block which the server needs to access is block 1 by adding 1 to the integral part of 0.625. Specifically, the server may start to access block 1 from the 20 MB address of block 1.

204: Determine a storage controller corresponding to the block from a second list according to the determined block.

The second list can store the information of each of the blocks into which the volume is divided and its corresponding storage controller, and the format of the second list may be similar to that shown in the preceding Table 2 and here are not described in this embodiment of the present invention.

205: Send a data reading request or a data writing request to the storage controller corresponding to the block to process.

The preceding introduces another method for a server to access a volume provided in this embodiment of the present invention. This embodiment of the present invention may prevent the following case: A data reading request or a data writing request of the server to the corresponding storage controller is forwarded when the block which the server needs to access by the storage controller from the inquiry server is another storage controller. Therefore, the time delay when the data reading request or the data writing request of the server reaches the block that needs to be accessed is shortened and the memory resources of the storage controller occupied the data reading request or the data writing request of the server are decreased.

The method for the server to access a volume provided in the embodiment of the present invention can lower the amount of the data exchanged between storage controllers, reducing the bandwidth of the data bus between storage controllers or removing the data bus between storage controllers.

Embodiment 3

Figure 3:
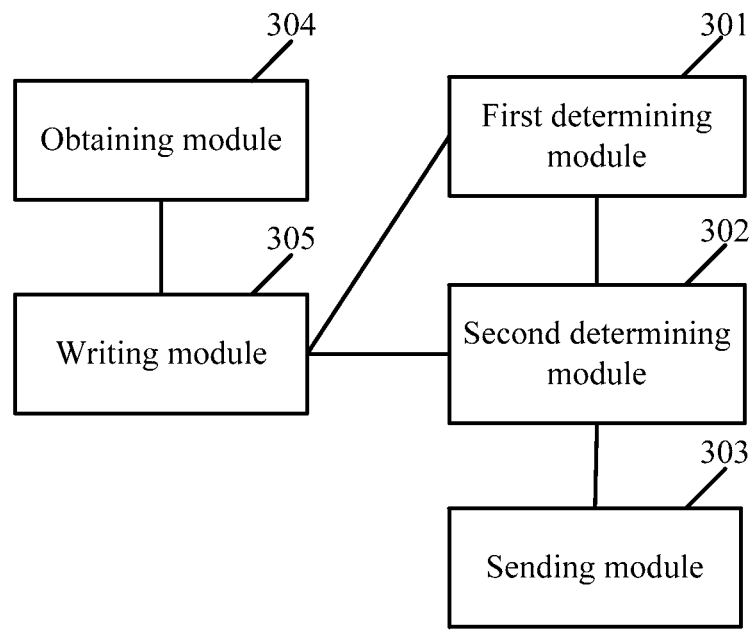
FIG. 3 is a schematic structural diagram of a server according to an embodiment of the present invention.

FIG. 3 is a schematic diagram of the structure of a server provided in this embodiment of the present invention. As shown in FIG. 3, the server may include:

a first determining module 301, configured to determine, from a first list, a block that needs to be accessed according to an access offset of a volume that needs to be accessed;

where, the preceding first list can be used for storing the information of at least two blocks with the same size into which a volume is divided. The format of the first list may be similar to that shown in the preceding Table 1 and here is not described in the embodiment of the present invention.

a second determining module 302, configured to determine, from a second list, the storage controller corresponding to the block according to the block determined by the first determining module 301;

where, the second list can be used for storing the information of each of the blocks and its corresponding storage controller into which the volume is divided. The format of the second list may be similar to that shown in the preceding Table 2 and here is not described in this embodiment of the present invention.

In an embodiment, the preceding first list may be stored in the first determining module 301 as a configuration file, and the preceding second list may be stored in the second determining module 302 as a configuration file.

and a sending module 303, configured to send a data reading request or a data writing request to the storage controller that corresponds to the block and that is determined by the second determining module 302 to process.

As shown in FIG. 3, the server may further include:

an obtaining module 304, configured to obtain, from the MDS, the information of at least two blocks with the same size into which the volume is divided and obtain the information of each of the blocks into which the volume is divided and its corresponding storage controller; and a writing module 305, configured to write the information of at least two blocks with the same size into which the volume is divided obtained by the obtaining module 304 into a first list for storage and the information of each of the blocks into which the volume is divided and its corresponding storage controller into a second list for storage, in which the information of at least two blocks and the information of a storage controller are obtained by the obtaining module 304.

As shown in FIG. 3, when the preceding first list is stored in the first determining module 301 as a configuration file and the preceding second list stored in the second determining module 302 as a configuration file, the writing module 305 can write the information of at least blocks with the same size into which the volume is divided obtained by the obtaining module 304 into the first list that the determining module 301 stores and write the information of each of the blocks into which the volume is divided and its corresponding storage controller obtained by the obtaining module 304 into the second list that the second determining module 302 stores, in which the information of at least two blocks and the information of a storage controller are obtained by the obtaining module 304.

In an embodiment, specifically, the first determining module 301 can divide the access offset of the volume by the size of the blocks into which the volume is divided to obtain a quotient and add 1 to the integral part of the quotient to obtain the block that needs to be accessed.

Figure 4:
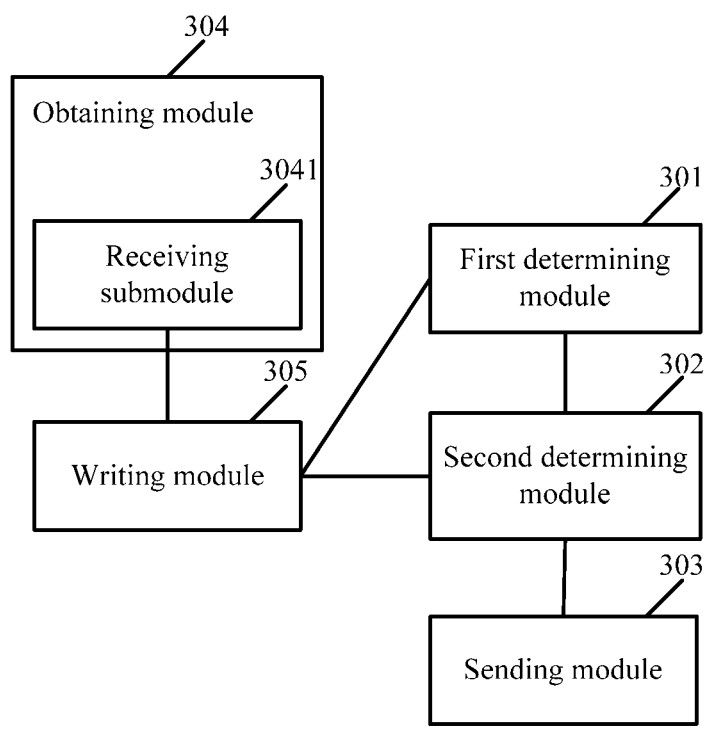
FIG. 4 is a schematic structural diagram of another server according to an embodiment of the present invention.

FIG. 4 is a schematic diagram of the structure of another server provided in this embodiment of the present invention. As shown in FIG. 4, the obtaining module 304 of the server may include:

an obtaining submodule 3041, configured to receive, from the MDS, the information of at least two blocks with the same size into which a volume is divided and the information of each of the blocks and its corresponding storage controller.

Figure 5:
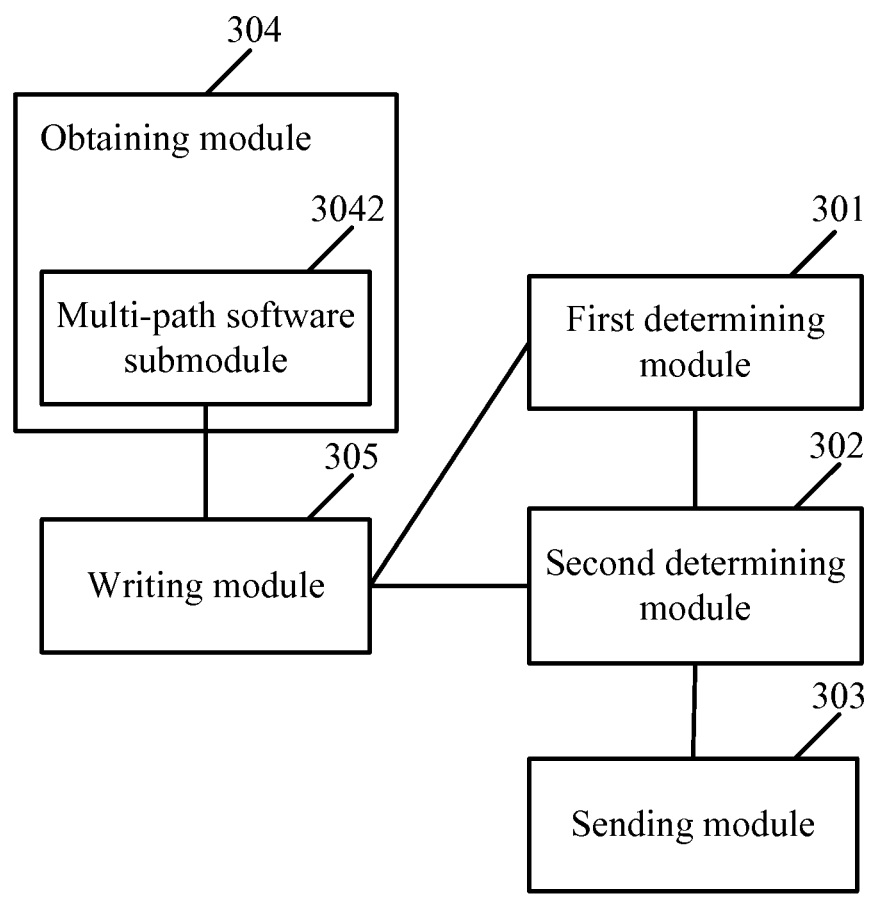
FIG. 5 is a schematic structural diagram of another server according to an embodiment of the present invention.

FIG. 5 is a schematic diagram of the structure of another server provided in this embodiment of the present invention. As shown in FIG. 5, the obtaining module 304 of the server may include:

a multi-path software submodule 3042, configured to obtain, from the MDS, the information of at least two blocks with the same size into which a volume is divided and the information of each of the blocks and its corresponding storage controller when the multi-path software is initializing.

The above introduces the server provided in this embodiment of the present invention. The MDS provided in this embodiment of the present invention can store at least two blocks into which a volume is divided and each of the blocks and its corresponding storage controller. The server can determine a block that needs to be accessed according to an access offset of a volume that needs to be accessed and then determine the storage controller corresponding to the block. The server can directly send a data reading request or a data writing request to the determined storage controller to process. In this way, the following case may be prevented: The data reading request or the data writing request of the server needs to be forwarded to a corresponding storage controller when the found storage controller corresponding to the block which the server needs to access is another storage controller but not the one that conducts the query. Therefore, the time delay when the data reading request or the data writing request of the server reaches the block that needs to be accessed is shortened and the memory resources of the storage controller occupied by the data reading request or the data writing request of the server are decreased.

Those skilled in the art may understand: All or part of the steps of the method of the preceding embodiment can be preformed through the hardware instructed by a program. The preceding program can be stored in a computer-readable storage medium. When the program is in execution, steps of the method of this embodiment are all executed. The preceding storage medium includes: various kinds of media capable of storing program codes, such as read-only memory (Read-Only Memory, ROM), random access memory (Random Access Memory, RAM), magnetic disk and optical disk.

The above describes a server and a method for the server to access a volume provided in embodiments of the present invention. Embodiments are applied for illustrating the principle and implementation ways. The description of such embodiments is only for helping understand the method and core concept of the present invention; meanwhile, those skilled in the art can make modifications to the specific implementation and application range according to the concept of the present invention. In conclusion, the content of this specification shall not be construed as a limitation to the present invention.

What is claimed is:

1. A method for a server, which connects to a plurality of storage controllers, to access a volume of a storage device, comprising:
    obtaining first information about the volume, and blocks within the volume by searching a meta data server, wherein the volume is divided into blocks having a same size;
obtaining second information including corresponding relationships between the storage controllers and the blocks by searching the meta data server;
    receiving a request for accessing the volume wherein the request comprises an access offset of the volume;
    determining, one of the blocks to be accessed according to the access offset of the volume and the first information;
    determining, one of the storage controllers corresponding to the block to be accessed by searching the second information according to the block; and
    forwarding the request to the storage controller,
    wherein, upon determining that the server is loaded with multi-path software, the step of obtaining the first information about the volume and its blocks by searching the meta data server comprises: obtaining the first information about the volume and its blocks by searching the meta data server when the multi-path software is initializing; and
    the step of obtaining the second information including the corresponding relationship between the storage controllers and the blocks by searching the meta data server comprises:
obtaining the second information including the corresponding relationship between the storage controllers and the blocks by searching the meta data server when the multi-path software is initializing.

2. The method according to claim 1, wherein the step of determining one of the blocks to be accessed according to the access offset of the volume and the first information comprises:
    dividing the access offset of the volume by the same size of the block included in the first information to generate a quotient; and
    adding a number 1 to an integral part of the quotient to determine the block to be accessed.

3. The method according to claim 1, further comprising:
    receiving the first information sent from the storage controller to generate a first list wherein the first list comprises the first information;
    receiving the second information sent from the storage controller to generate a second list, wherein the second list comprises the second information;
    storing the first list and the second list.

4. The method according to claim 1, wherein the request for accessing the volume comprises one of the group consisting of: (a) a reading request from the volume, and (b) a data writing request to the volume.

5. A server, which connects to a plurality of storage controllers, to access a volume of a storage device, the server comprising:
    a memory; and
    a processor configured to:
        obtain first information about the volume and blocks within the volume by searching a meta data server, wherein the volume is divided into blocks having a same size;
        obtain second information including corresponding relationships between the storage controllers and the blocks by searching the meta data server;
        receive a request for accessing the volume, wherein the request comprises an access offset of the volume;
        determine, one of the blocks to be accessed according to the access offset of the volume and the first information, one of the storage controllers corresponding to the block to be accessed by searching the second information according to the block; and
        forward the request to the storage controller, wherein
    upon determining that the server is loaded with multi-path software, the processor is further configured to:
        obtain the first information about the volume and its blocks by searching the meta data server when the multi-path software is initializing; and
        obtain the second information including the corresponding relationship between the storage controllers and the blocks by searching the meta data server, when the multi-path software is initializing.

6. The server according to claim 5, wherein the processor is configured to divide the access offset of the volume by the same size of the block included in the first information to generate a quotient; and
    add a number 1 to an integral part of the quotient to determine the block to be accessed.

7. The server according to claim 5, wherein the processor is further configured to
    receive the first information sent from the storage controller to generate a first list wherein the first list comprises the first information;
    receive the second information sent from the storage controller to generate a second list, wherein the second list comprises the second information;
    store the first list and the second list.

8. The server according to claim 5, wherein the request for accessing the volume comprises one of the group consisting of: (a) a reading request from the volume, (b) a data writing request to the volume.

* * * * *

UNITED STATES PATENT AND TRADEMARK OFFICE
CERTIFICATE OF CORRECTION

PATENT NO. : 8,495,165 B2
APPLICATION NO. : 13/525626
DATED : July 23, 2013
INVENTOR(S) : Luo et al.

It is certified that error appears in the above-identified patent and that said Letters Patent is hereby corrected as shown below:

In the Claims

Column 10, line 21, "one of the storage controllers" should read

-- determine one of the storage controllers --.

Signed and Sealed this
Twenty-ninth Day of October, 2013

Teresa Stanek Rea
*Deputy Director of the United States Patent and Trademark Office*